(12) United States Patent
Takashima et al.

(10) Patent No.: US 11,518,431 B2
(45) Date of Patent: Dec. 6, 2022

(54) STEERING SYSTEM AND CONTROL METHOD FOR STEERING SYSTEM

(71) Applicant: TOYOTA JIDOSHA KABUSHIKI KAISHA, Toyota (JP)

(72) Inventors: Toru Takashima, Susono (JP); Yusuke Nakano, Oiso (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 445 days.

(21) Appl. No.: 16/662,556

(22) Filed: Oct. 24, 2019

(65) Prior Publication Data

US 2020/0130728 A1 Apr. 30, 2020

(30) Foreign Application Priority Data

Oct. 30, 2018 (JP) .............................. JP2018-204091

(51) Int. Cl.
*B62D 5/04* (2006.01)
*B62D 15/02* (2006.01)

(52) U.S. Cl.
CPC ......... *B62D 5/0457* (2013.01); *B62D 15/021* (2013.01)

(58) Field of Classification Search
CPC .............................. B62D 5/043; B62D 15/021
See application file for complete search history.

(56) References Cited

U.S. PATENT DOCUMENTS 10,351,168 B2 * 7/2019 Tsubaki ............... B62D 15/025

FOREIGN PATENT DOCUMENTS

| DE | 102015005124 A1 | | 10/2016 |
| JP | 2001-48031 A | | 2/2001 |
| JP | 2003-137127 A | | 5/2003 |
| JP | 2003276623 | * | 10/2003 |
| JP | 2004-306717 A | | 11/2004 |
| JP | 2004306717 A | * | 11/2004 |
| JP | 2007-237837 A | | 9/2007 |
| JP | 5141311 B2 | * | 2/2013 |
| JP | 2014-133521 A | | 7/2014 |
| JP | 2015-182493 A | | 10/2015 |

* cited by examiner

*Primary Examiner* — Ig T An
(74) *Attorney, Agent, or Firm* — Sughrue Mion, PLLC

(57) ABSTRACT

A steering system is configured such that a ratio of a turning angle change amount with respect to a steering angle change amount in a first steering angle area is larger than the ratio of the turning angle change amount with respect to the steering angle change amount in a second steering angle area, and a steering angle in the second steering angle is smaller than the steering angle of the first steering angle area. An electronic control unit of the steering system sets a delay degree of a change in turning angle with respect to a change in steering angle in the first steering angle area to be larger than the delay degree of the change in turning angle with respect to the change in steering angle in the second steering angle area regardless of a turning-over operation or a turning-back operation.

7 Claims, 12 Drawing Sheets

STEERING SYSTEM AND CONTROL METHOD FOR STEERING SYSTEM

INCORPORATION BY REFERENCE

The disclosure of Japanese Patent Application No. 2018-204091 filed on Oct. 30, 2018 including the specification, drawings and abstract is incorporated herein by reference in its entirety.

BACKGROUND

1. Technical Field

The disclosure relates to a steering system and a control method for a steering system capable of changing a ratio of a turning angle change amount with respect to a steering angle change amount.

2. Description of Related Art

Japanese Patent Application Publication No. 2004-306717 (JP 2004-306717 A) discloses a technique relating to a steer-by-wire steering system which turns a steered wheel by a turning motor while not being mechanically connected to a steering wheel. In the technique disclosed in JP 2004-306717 A, a steering angle area is divided into three areas and a gear ratio sequentially decreases from a steering angle area near a neutral position to a steering angle area near a lock position. Accordingly, the above-described technique is able to turn the steered wheel to a maximum turning angle without switching hands on the steering wheel.

SUMMARY

In the steering system that requires switching of hands on the steering wheel in order to turn the steered wheel to the maximum turning angle, a gear ratio is fixed or a change amount thereof is very small even when the gear ratio is changeable. However, in order to turn the steered wheel to the maximum turning angle without switching hands on the steering wheel, it is necessary to make the gear ratio must be smaller than that of a normal state in some steering angle area. In the above-described technique, the gear ratio is smaller than that of the normal state in the steering angle area near the lock position.

The steering angle area near the lock position is an area used for turning a direction or parking in a garage or the like, but when the gear ratio in that area is set to be small, there is an advantage that a correction steering operation is easy when turning a direction or parking in a garage. Meanwhile, when the gear ratio decreases, the ratio of the turning angle change amount with respect to the steering angle change amount increases, so that a change in turning angle becomes abrupt with respect to a change in steering angle. When the turning angle change speed is fast, a lateral acceleration of the vehicle noticeably occurs and hence the occupant feels uncomfortable.

The disclosure provides a steering system and a control method for a steering system capable of preventing occurrence of a lateral acceleration causing an occupant to feel uncomfortable while securing responsiveness of a turning angle with respect to a steering operation.

A first aspect of the disclosure provides a steering system that includes an electronic control unit. The electronic control unit is configured such that a ratio of a turning angle change amount with respect to a steering angle change amount in a first steering angle area is larger than the ratio of the turning angle change amount with respect to the steering angle change amount in a second steering angle area. The second steering angle area is an area in which a steering angle is smaller than the steering angle of the first steering angle area. The electronic control unit is configured to perform a first process of setting a delay degree of a change in turning angle with respect to a change in steering angle in the first steering angle area to be larger than the delay degree of the change in turning angle with respect to the change in steering angle in the second steering angle area regardless of a turning-over operation or a turning-back operation.

According to the steering system with the above-described configuration, in the first steering angle area in which the turning angle is changed at a high frequency by the driver's steering operation, since the delay degree of the change in turning angle with respect to the change in steering angle increases, the gain of the lateral acceleration caused by the high-frequency operation is reduced. Meanwhile, in the second steering angle area in which the turning angle is not easily changed at a high frequency, since the delay degree of the change in turning angle with respect to the change in steering angle is kept relatively small, the responsiveness of the turning angle with respect to the steering operation can be secured.

Additionally, in the first steering angle area, the ratio of the turning angle change amount with respect to the steering angle change amount may be constant, or may be smaller on the side closer to the second steering angle area. In the second steering angle area, the ratio of the turning angle change amount with respect to the steering angle change amount may be constant, or may be larger on the side closer to the first steering angle area. Further, in the first steering angle area, the delay degree of the change in turning angle with respect to the change in steering angle may be constant, or may be smaller on the side closer the second steering angle area. In the second steering angle area, the delay degree of the change in turning angle with respect to the change in steering angle may be constant, or may be larger on the side closer to the first steering angle area.

The steering system may be configured such that the ratio of the turning angle change amount with respect to the steering angle change amount continuously changes from the second steering angle area to the first steering angle area. The electronic control unit may be configured such that the delay degree of the change in turning angle with respect to the change in steering angle continuously changes from the second steering angle area to the first steering angle area in the first process. The steering system may be configured such that the ratio of the turning angle change amount with respect to the steering angle change amount continuously increases from the second steering angle area to the first steering angle area. The electronic control unit may be configured such that the delay degree of the change in turning angle with respect to the change in steering angle continuously increases from the second steering angle area to the first steering angle area in the first process.

According to the steering system with the above-described configuration, it is possible to change the gain of the lateral acceleration caused by the high-frequency operation so that the occupant does not feel uncomfortable while smoothly changing the responsiveness of the turning angle with respect to the steering operation from the second steering angle area to the first steering angle area or from the first steering angle area to the second steering angle area. Additionally, an area in which the ratio of the turning angle change amount with respect to the steering angle change amount is constant may be provided between the second steering angle area and the first steering angle area. Further, an area in which the delay degree of the change in turning angle with respect to the change in steering angle is constant may be provided between the second steering angle area and the first steering angle area.

The steering system may be configured such that the ratio of the turning angle change amount with respect to the steering angle change amount in the first vehicle speed area is larger than the ratio of the turning angle change amount with respect to the steering angle change amount in the second vehicle speed area in which the vehicle speed is higher than the vehicle speed of the first vehicle speed area. The electronic control unit may be configured to further perform a second process of setting the delay degree of the change in turning angle with respect to the change in steering angle in the first vehicle speed area to be larger than the delay degree of the change in turning angle with respect to the change in steering angle in the second vehicle speed area.

According to the steering system with the above-described configuration, in the first vehicle speed area in which the turning angle is changed at a high frequency by the driver's steering operation, since the delay degree of the change in turning angle with respect to the change in steering angle increases, the gain of the lateral acceleration caused by the high-frequency operation is reduced. Meanwhile, in the second vehicle speed area in which the turning angle is not easily changed at a high frequency, since the delay degree of the change in turning angle with respect to the change in steering angle is kept relatively small, it is possible to secure the responsiveness of the turning angle with respect to the steering operation.

Additionally, in the first vehicle speed area, the ratio of the turning angle change amount with respect to the steering angle change amount may be constant, or may be smaller on the side closer to the second vehicle speed area. In the second vehicle speed area, the ratio of the turning angle change amount with respect to the steering angle change amount may be constant, or may be larger on the side closer to the first vehicle speed area. Further, in the first vehicle speed area, the delay degree of the change in turning angle with respect to the change in steering angle may be constant, or may be smaller on the side closer to the second vehicle speed area. In the second vehicle speed area, the delay degree of the change in turning angle with respect to the change in steering angle may be constant, or may be larger on the side closer to the first vehicle speed area.

The steering system may be configured such that the ratio of the turning angle change amount with respect to the steering angle change amount continuously changes from the second vehicle speed area to the first vehicle speed area. The electronic control unit may be configured such that the delay degree of the change in turning angle with respect to the change in steering angle continuously changes from the second vehicle speed area to the first vehicle speed area in the second process. The steering system may be configured such that the ratio of the turning angle change amount with respect to the steering angle change amount continuously increases from the second vehicle speed area to the first vehicle speed area. The electronic control unit may be configured such that the delay degree of the change in turning angle with respect to the change in steering angle continuously increases from the second vehicle speed area to the first vehicle speed area in the second process.

According to the steering system with the above-described configuration, it is possible to change the gain of the lateral acceleration caused by the high-frequency operation so that the occupant does not feel uncomfortable while smoothly changing the responsiveness of the turning angle with respect to the steering operation from the second vehicle speed area to the first vehicle speed area or from the first vehicle speed area to the second vehicle speed area. Additionally, an area in which the ratio of the turning angle change amount with respect to the steering angle change amount is constant may be provided between the second vehicle speed area and the first vehicle speed area. Further, an area in which the delay degree of the change in turning angle with respect to the change in steering angle is constant may be provided between the second vehicle speed area and the first vehicle speed area.

The steering system may include a steering mechanism which turns a steered wheel by a turning motor while not being mechanically connected to the steering member.

When the steering mechanism is provided in the steering system, the electronic control unit may be configured to perform a process of converting a steering angle of the steering member into a target turning angle, a process of obtaining a correction target turning angle by passing the target turning angle through a low-pass filter, and a process of controlling the turning motor according to the correction target turning angle. The first process may include a process of setting the cut-off frequency of the low-pass filter of the first steering angle area to be smaller than the cut-off frequency of the low-pass filter of the second steering angle area. The second process may include a process of setting the cut-off frequency of the low-pass filter of the first vehicle speed area to be smaller than the cut-off frequency of the low-pass filter of the second vehicle speed area.

According to the steering system with the above-described configuration, it is possible to delay a change in turning angle with respect to a change in steering angle by the low-pass filter and to change the delay degree by the cut-off frequency. Specifically, it is possible to increase the delay degree of the change in turning angle with respect to the change in steering angle by decreasing the cut-off frequency of the low-pass filter.

Further, when the steering system includes the steering mechanism, the electronic control unit may be configured to perform a process of converting a steering angle of the steering member into a target turning angle, a process of obtaining a correction target turning angle by passing the target turning angle through a rate limiter, and a process of controlling a turning motor according to the correction target turning angle. The first process may include a process of setting the limitation of the rate limiter of the first steering angle area to be weaker than the limitation of the rate limiter of the second steering angle area. The second process may include a process of setting the limitation of the rate limiter of the first vehicle speed area to be weaker than the limitation of the rate limiter of the second vehicle speed area.

According to the steering system with the above-described configuration, it is possible to delay a change in turning angle with respect to a change in steering angle by the rate limiter and to change the delay degree by the strength of limitation of the rate limiter. Specifically, it is possible to increase the delay degree of the change in turning angle with respect to the change in steering angle by weakening the limitation of the rate limiter.

A second aspect of the disclosure provides a control method for a steering system that includes: setting a ratio of a turning angle change amount with respect to a steering angle change amount in a first steering angle area to be larger than the ratio of the turning angle change amount with respect to the steering angle change amount in a second steering angle area by an electronic control unit; and setting a delay degree of a change in turning angle with respect to a change in steering angle in the first steering angle area to be larger than the delay degree of the change in turning angle with respect to the change in steering angle in the second steering angle area regardless of a turning-over operation or a turning-back operation by the electronic control unit. The second steering angle area is an area in which a steering angle is smaller than the steering angle of the first steering angle area.

As described above, according to the steering system and the control method of the steering wheel, it is possible to suppress the occurrence of the lateral acceleration that makes the occupant feel uncomfortable while securing the responsiveness of the turning angle with respect to the steering operation.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Hereinafter, embodiments of the disclosure will be described with reference to the drawings. However, when the numbers including the quantity, volume, amount, and range of the components in the embodiments to be described below are mentioned, the disclosure is not limited to the numbers unless otherwise specified or the number is clearly specified in principle. Further, the structures or steps explained in the embodiments to be described below are not essential to the disclosure unless otherwise specified or those are clearly specified in principle.

1. Configuration of Steering System

Figure 1:
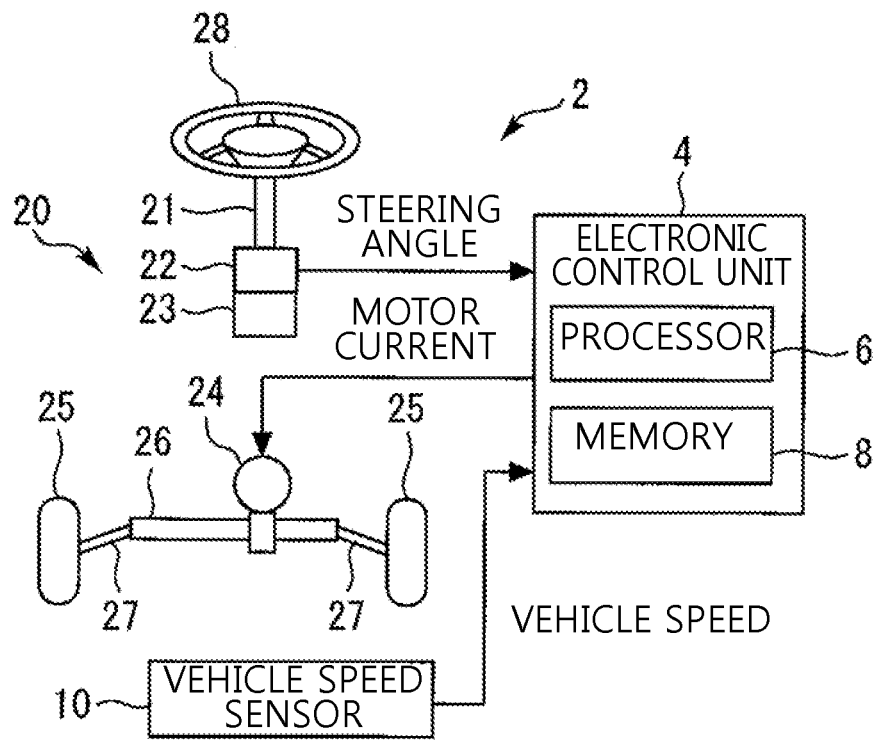
FIG. 1 is a diagram showing a configuration of a steering system according to an embodiment of the disclosure.

FIG. 1 is a diagram showing a configuration of a steering system 2 according to an embodiment of the disclosure. The steering system 2 includes a steering mechanism 20 and a control device 4.

The steering mechanism 20 is a steer-by-wire steering mechanism capable of turning a steered wheel 25 by a turning motor 24 while not being mechanically connected to a steering wheel 28. The steering wheel 28 is a steering member to which a driver's steering operation is input. The steering wheel 28 is connected to a reaction force motor 23 through a steering shaft 21. The reaction force motor 23 applies a reaction force corresponding to the turning angle of the steered wheel 25 to the steering wheel 28. The turning angle of the steered wheel 25 is calculated from a signal of a turning angle sensor (not shown) provided near the turning motor 24. A steering angle sensor 22 which outputs a signal corresponding to the rotation angle, that is, the steering angle of the steering wheel 28 is attached to the steering shaft 21.

The turning motor 24 is attached to a rack shaft 26 through a deceleration mechanism (not shown). The rack shaft 26 is not mechanically connected to the steering shaft 21. The steered wheel 25 is connected to the rack shaft 26 through a tie rod 27. When the turning motor 24 is rotated so that the rack shaft 26 is moved linearly in the axial direction, the turning angle of the steered wheel 25 is changed through the tie rod 27.

The control device 4 is configured to control a torque for turning control applied from the turning motor 24 to the rack shaft 26 by controlling a motor current supplied to the turning motor 24. Various sensors that measure physical quantities relating to the turning control are directly connected to the control device 4 or connected thereto via a communication network constructed in a vehicle. Such a sensor includes at least the steering angle sensor 22 and a vehicle speed sensor 10.

The control device 4 is an electronic control unit (ECU) which includes at least one processor 6 and at least one memory 8. Various data including maps used for the turning control or various programs are stored in the memory 8. When the processor 6 reads out the program from the memory 8 and executes the program, various functions relating to the turning control are realized in the control device 4.

2. Function of Control Device

Figure 2:
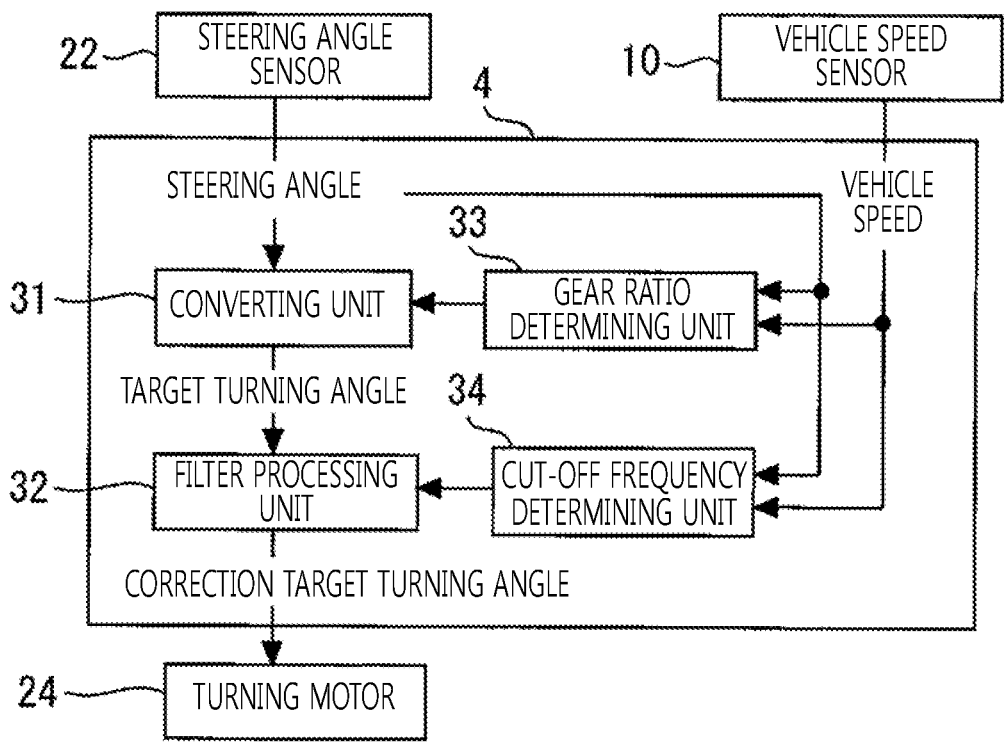
FIG. 2 is a diagram showing a function of a control device of the steering system according to the embodiment.

FIG. 2 is a diagram conveniently illustrating a configuration of the control device 4 of the steering system according to the embodiment of the disclosure. In the turning control performed by the control device 4, a steering angle obtained from a signal of the steering angle sensor 22 and a vehicle speed obtained from a signal of the vehicle speed sensor 10 are used as an input. In FIG. 2, a function of the control device 4 relating to the turning control is depicted as a block. As depicted as a block in FIG. 2, the control device 4 includes a converting unit 31, a filter processing unit 32, a gear ratio determining unit 33, and a cut-off frequency determining unit 34. These function units 31, 32, 33, and 34 provided in the control device 4 correspond to the program or a part of the program stored in the memory 8 of the control device 4. When the program is read out from the memory 8 and is executed by the processor 6, the functions of these function units 31, 32, 33, and 34 are realized by the control device 4. Hereinafter, the functions of the function units 31, 32, 33, and 34 will be described.

The converting unit 31 converts the steering angle obtained from the signal of the steering angle sensor 22 into a target turning angle. The target turning angle is a target value of the turning angle to be realized by the control of the turning motor 24. However, the target turning angle calculated herein cannot be directly given to the turning motor 24. The target turning angle corrected by the filter processing unit 32, that is, a correction target turning angle to be described later can be given to the turning motor 24.

A gear ratio which is determined by the gear ratio determining unit 33 is used when converting the steering angle into the target turning angle. Since the steering mechanism 20 is of a steer-by-wire type, the steering wheel 28 and the steered wheel 25 are not connected each other through a gear mechanism. However, in the present specification, for convenience of description, a ratio between the steering angle change amount and the turning angle change amount is referred to as a gear ratio (a steering gear ratio). Since a ratio of the turning angle change amount with respect to the steering angle change amount increases as the gear ratio decreases, the turning angle changes more quickly in response to the operation of the steering wheel 28 by the driver.

The steering angle and the vehicle speed are input to the gear ratio determining unit 33. The gear ratio determining unit 33 determines the gear ratio on the basis of these input information. In the relationship with the steering angle, the gear ratio determining unit 33 determines the gear ratio with respect to the steering angle so that the ratio of the turning angle change amount with respect to the steering angle change amount in a predetermined first steering angle area becomes larger than the ratio of the turning angle change amount with respect to the steering angle change amount in a predetermined second steering angle area. Both of the first steering angle area and the second steering angle area are included in the steering angle area from a neutral position (a position in which the steering angle is zero) to an end position (a position in which the steering angle is maximal, also called a lock position) of the steering wheel 28 and the second steering angle area is an area in which the steering angle is smaller than the steering angle of the first steering angle area, that is, an area near the neutral position. The detailed setting of the gear ratio with respect to the steering angle and the detailed example thereof will be described later.

Further, in the relationship with the vehicle speed, the gear ratio determining unit 33 changes the gear ratio in response to the vehicle speed. However, the gear ratio determining unit 33 makes the relationship between the vehicle speed and the gear ratio to be dependent on the steering angle. For example, when the steering angle is near the neutral position, the gear ratio with respect to the vehicle speed is determined so that the ratio of the turning angle change amount with respect to the steering angle change amount in a predetermined first vehicle speed area becomes larger than the ratio of the turning angle change amount with respect to the steering angle change amount in a predetermined second vehicle speed area. Both of the first vehicle speed area and the second vehicle speed area are included in a vehicle speed area from a stop speed to a maximum speed of a vehicle and the second vehicle speed area is an area in which the vehicle speed is larger than the vehicle speed of the first vehicle speed area, that is, an area near a maximum speed. The detailed setting of the gear ratio with respect to the vehicle speed and the detailed example thereof will be described below.

The filter processing unit 32 passes the target turning angle obtained by the converting unit 31 through a low-pass filter and outputs the target turning angle after processing by the low-pass filter as the correction target turning angle. An attenuation effect obtained by the low-pass filter works for both of a change in target turning angle caused by a turning-over operation and a change in target turning angle caused by a turning-back operation. The turning-over operation is an operation for rotating the steering wheel 28 toward the end position and the turning-back operation is an operation for rotating the steering wheel 28 toward the neutral position.

A motor current for realizing the correction target turning angle is given to the turning motor 24. When the turning motor 24 is controlled according to the correction target turning angle processed by the low-pass filter, a delay of a change in turning angle with respect to a change in steering angle occurs. This delay degree depends on the cut-off frequency of the low-pass filter.

The cut-off frequency of the low-pass filter is determined by the cut-off frequency determining unit 34. The steering angle and the vehicle speed are input to the cut-off frequency determining unit 34. The cut-off frequency determining unit 34 determines the cut-off frequency by a first process and a second process based on these input information.

The cut-off frequency determining unit 34 changes the cut-off frequency in response to the steering angle. However, the cut-off frequency is determined with respect to the steering angle and is not dependent on the turning-over operation of increasing the steering angle or the turning-back operation of decreasing the steering angle. The cut-off frequency determining unit 34 decreases the cut-off frequency so that a delay degree of a change in turning angle with respect to a change in steering angle in the first steering angle area becomes larger than the delay degree of the change in turning angle with respect to the change in steering angle in the second steering angle area. This is the first process which is performed by the cut-off frequency determining unit 34. The detailed setting of the cut-off frequency with respect to the steering angle and the detailed example thereof will be described below.

Further, the cut-off frequency determining unit 34 changes the cut-off frequency in response to the vehicle speed. However, the cut-off frequency determining unit 34 allows the relationship between the vehicle speed and the cut-off frequency to be dependent on the steering angle. For example, when the steering angle is near the neutral position, the cut-off frequency is decreased so that the delay degree of the change in turning angle with respect to the change in steering angle in the first vehicle speed area becomes larger than the delay degree of the change in turning angle with respect to the change in steering angle in the second vehicle speed area. This is the second process which is performed by the cut-off frequency determining unit 34. The detailed setting of the cut-off frequency with respect to the vehicle speed and the detailed example thereof will be described below.

3. Setting of Gear Ratio for Steering Angle

Figure 3:
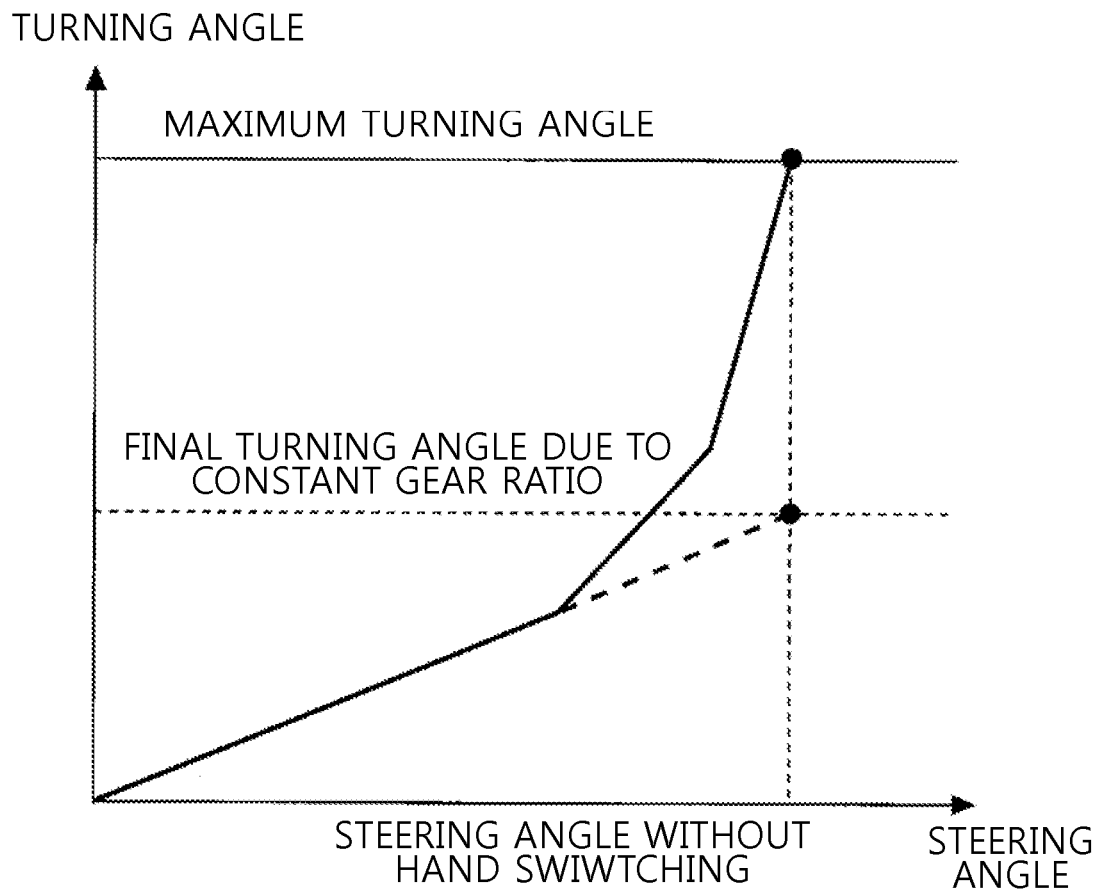
FIG. 3 is a diagram showing a relationship between a steering angle and a turning angle according to the embodiment.

Here, the setting of the gear ratio for the steering angle will be described in detail with reference to the drawings. FIG. 3 is a diagram showing a relationship between the steering angle and the turning angle realized by the control device 4. The steering angle without a hand switching operation in FIG. 3 means a maximum steering angle in which the driver can steer the steering wheel 28 without switching hands on the steering wheel. Specifically, the maximum steering angle is an angle of about 150° to 170° in each of the right and left directions. It is preferable that the driver can steer the steering wheel 28 without switching hands in order to reduce the burden on the driver and improve the drivability. However, when the steering wheel 28 is steered to the maximum steering angle in that case, the steered wheel 25 is required to be turned to a maximum turning angle. That is, the maximum steering angle in which the driver can steer the steering wheel 28 without switching hands is required to be the end position of the steering wheel 28.

A dotted line in the drawing show a relationship between the steering angle and the turning angle when the gear ratio is made constant in accordance with the gear ratio capable of obtaining optimal steering characteristics near the neutral position in the whole steering angle area from the neutral position to the end position. In this case, a final turning angle when the steering wheel 28 is steered to the end position is less than the required maximum turning angle. However, when a constant gear ratio is set so that the final turning angle matches the maximum turning angle, there is a possibility that the steering characteristics in the vicinity of the neutral position becomes sensitive and the drivability is impaired.

For this reason, the gear ratio determining unit 33 determines the gear ratio with respect to the steering angle so that the turning angle change amount with respect to the steering angle change amount monotonously increases from the neutral position to the end position as indicated by a solid line in the drawing. That is, the gear ratio is determined in response to the steering angle so that the turning angle change amount with respect to the steering angle change amount decreases in the steering angle area near the neutral position and the turning angle change amount with respect to the steering angle change amount increases in the steering angle area near the end position. However, in FIG. 3, although a relationship between the steering angle and the turning angle is indicated by a bent line which is bent in two stages, this is merely a drawing for explanation and does not indicate an actual relationship.

Figure 4:
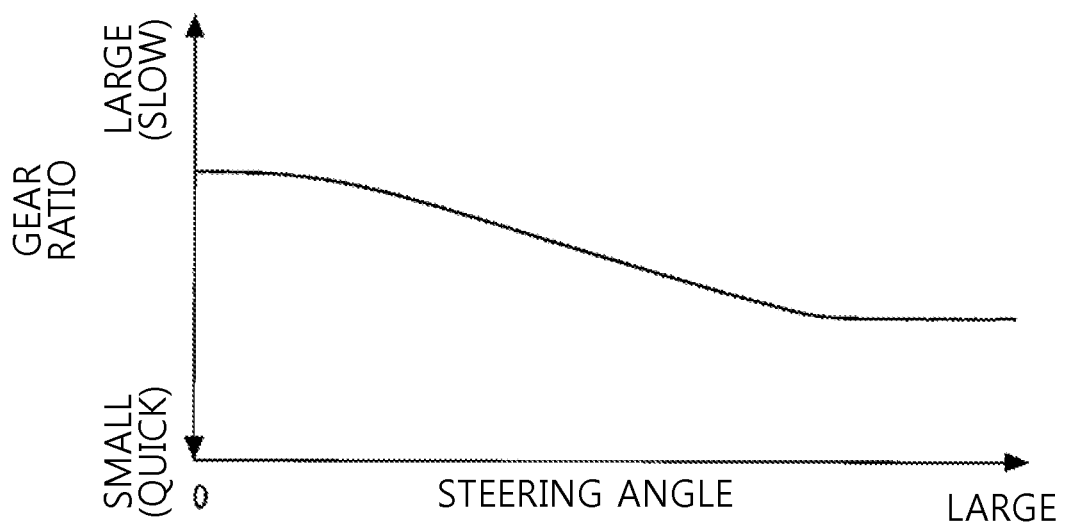
FIG. 4 is a diagram showing a relationship between a steering angle and a gear ratio according to the embodiment.

FIG. 4 is a diagram illustrating a relationship between the steering angle and the gear ratio realized by the control device 4. The gear ratio determining unit 33 determines the gear ratio from the steering angle by using maps or functions defining a relationship shown in FIG. 4. Specifically, the gear ratio determining unit 33 allows the gear ratio at the end position of the steering wheel 28 to be smaller than the gear ratio at the neutral position thereof and monotonously decreases the gear ratio in response to an increase in steering angle from the neutral position to the end position. The monotonous decrease mentioned herein means a broad monotonous decrease and a steering angle area in which the gear ratio is constant may exist. In the example shown in FIG. 4, the gear ratio continuously decreases from the neutral position to the end position so that the ratio of the turning angle change amount with respect to the steering angle change amount continuously increases from the neutral position to the end position. However, an area in which the gear ratio becomes constant regardless of the steering angle is provided in the vicinity of the neutral position and the vicinity of the end position.

4. Setting of Cut-off Frequency for Steering Angle

Figure 5:
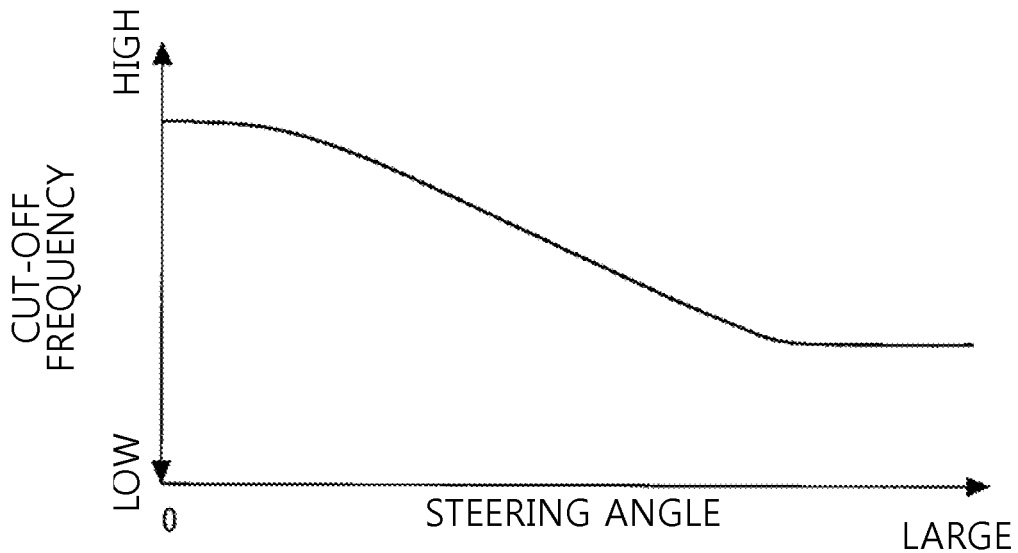
FIG. 5 is a diagram showing a relationship between a steering angle and a cut-off frequency of a low-pass filter according to the embodiment.

Next, the setting of the cut-off frequency for the steering angle will be described in detail with reference to the drawings. FIG. 5 is a diagram showing a relationship between the steering angle and the cut-off frequency realized by the control device 4. The cut-off frequency determining unit 34 determines the cut-off frequency from the steering angle by using maps or functions defining a relationship shown in FIG. 5. Specifically, the cut-off frequency determining unit 34 allows the cut-off frequency at the end position of the steering wheel 28 to be smaller than the cut-off frequency at the neutral position thereof and monotonously decreases the cut-off frequency in response to an increase in steering angle from the neutral position to the end position. The monotonous decrease mentioned herein means a broad monotonous decrease and a steering angle area in which the cut-off frequency is constant may exist. In the example shown in FIG. 5, the cut-off frequency continuously decreases from the neutral position to the end position so that the delay degree of the change in turning angle with respect to the change in steering angle continuously increases from the neutral position to the end position. However, an area in which the cut-off frequency becomes constant regardless of the steering angle is provided in the vicinity of the neutral position and the vicinity of the end position.

Here, an operation obtained by setting the cut-off frequency with respect to the steering angle as described above will be described. First, the gain of the lateral acceleration caused by the steering operation increases as the vehicle speed increases. However, for example, when the steering frequency increases even at a low speed of about 10 to 20 km/h, the gain of the lateral acceleration increases. Particularly at a low speed, the gain of the lateral acceleration in a normal state is low. However, the sensitivity of the gain of the lateral acceleration with respect to a change in steering frequency is high and the gain of the lateral acceleration largely increases as compared with the normal state.

Further, when the vehicle speed is a low speed (for example, about 10 to 20 km/h), the phase of the lateral acceleration advances more than the phase of the yaw rate in a certain frequency range. When the phase of the lateral acceleration advances more than the phase of the yaw rate, the lateral acceleration occurs prior to the turning of the vehicle, so that the neck or body of the occupant is shaken. If the turning of the vehicle is accompanied even when the neck or body is shaken by the lateral acceleration, the occupant can recognize the reason and hence hardly feels uncomfortable (or discomfort). Incidentally, when the neck or body is shaken prior to the turning of the vehicle, the occupant easily feels uncomfortable because this deviates from the feeling of the occupant. The uncomfortable feeling increases as the lateral acceleration increases. Thus, if the steering operation is performed at a high frequency when the vehicle runs at a low speed, the lateral acceleration which is larger than that of the normal state occurs prior to the turning of the vehicle and hence the occupant particularly easily feels uncomfortable.

Figure 6:
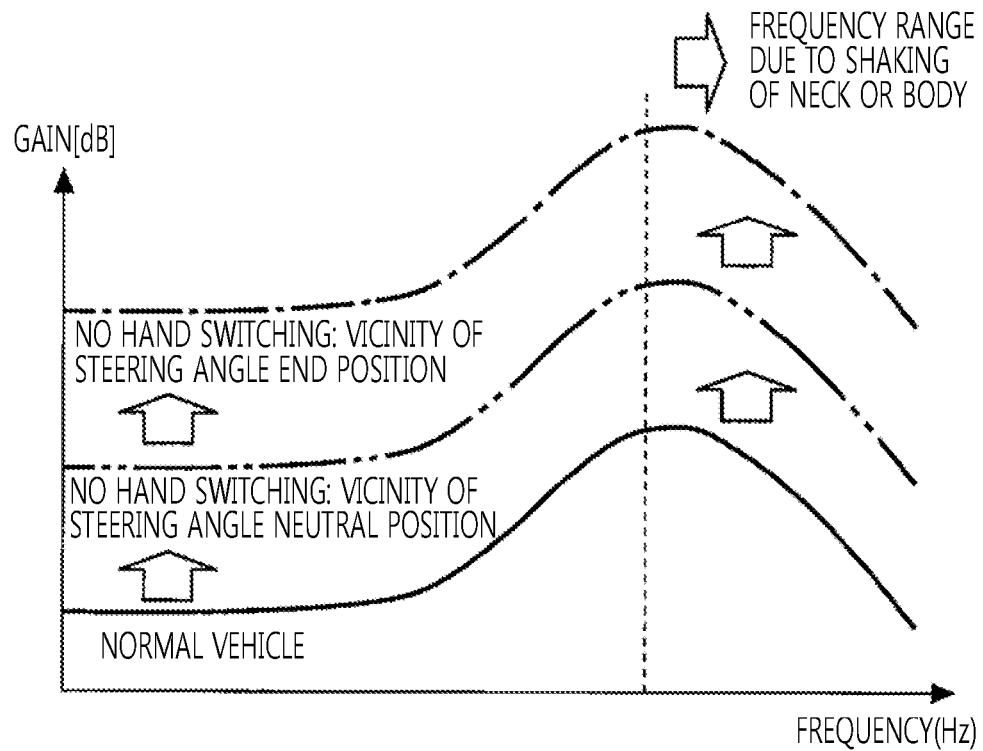
FIG. 6 is a diagram showing a relationship among a steering frequency, a gear ratio, and a gain of a lateral acceleration.

FIG. 6 is a diagram showing a relationship among the steering frequency, the gear ratio, and the gain of the lateral acceleration when the filter process according to the embodiment is not applied. The normal vehicle in FIG. 6 means a vehicle having a steering system that requires switching of hands on the steering wheel in order to turn the steered wheel to the maximum turning angle. The gear ratio of the vehicle in which the driver can steer the steering wheel 28 without switching hands is generally set to be lower than the gear ratio of the normal vehicle. Further, the gear ratio near the end position is lower than the gear ratio near the neutral position.

As the gear ratio decreases, the ratio of the turning angle change amount with respect to the steering angle change amount increases. For this reason, the gain of the lateral acceleration caused by the steering operation is larger in the vehicle in which the steering operation can be performed without switching hands than the normal vehicle and is particularly larger when the steering angle is near the end position. When focusing on the frequency range in which the neck or body of the occupant is shaken, the gain of the lateral acceleration of the vehicle in which the steering operation can be performed without switching hands is larger than the gain of the lateral acceleration of the normal vehicle. Therefore, in the case of the vehicle in which the steering operation can be performed without switching hands, the neck or body of the occupant is strongly shaken as compared with the normal vehicle. As a result, there is a high possibility that the occupant feels uncomfortable. Particularly, when the steering angle is near the end position, the gain of the lateral acceleration becomes maximal and hence the concern that the occupant feels uncomfortable becomes noticeable.

Figure 7:
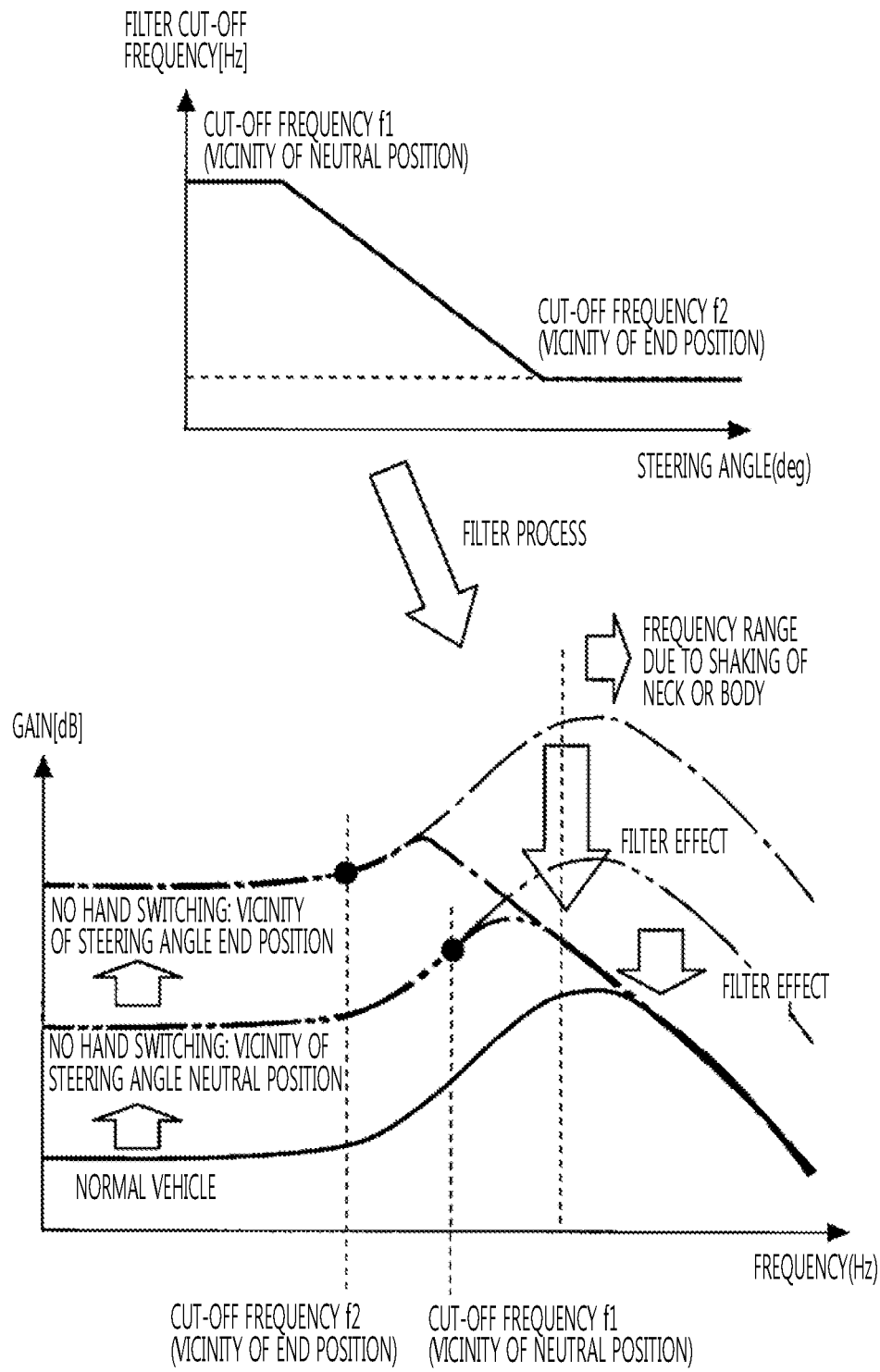
FIG. 7 is a diagram showing a relationship among a steering frequency, a gear ratio, and a gain of a lateral acceleration when a filter process according to the embodiment is applied.

FIG. 7 is a diagram showing a relationship among the steering frequency, the gear ratio, and the gain of the lateral acceleration when the filter process according to the embodiment is applied. In the embodiment, the filter process is performed on the target turning angle by the low-pass filter and the turning motor 24 is controlled according to the correction target turning angle. Accordingly, a delay occurs in a change in turning angle with respect to a change in steering angle. As a result, in the frequency range equal to or higher than the cut-off frequency of the low-pass filter, the amplitude of the turning angle decreases as the steering frequency increases and the gain of the lateral acceleration caused by the steering operation also decreases as the frequency increases.

The cut-off frequency which is determined by the cut-off frequency determining unit 34 in response to the steering angle is set to a frequency lower than the frequency range in which the neck or body of the occupant is shaken in the whole steering angle area. Further, as described above with reference to FIG. 5, the cut-off frequency of the end position is smaller than that of the neutral position. Accordingly, an effect of reducing the gain of the lateral acceleration by the low-pass filter becomes larger at the end position as compared with the neutral position in terms of the comparison at the same steering frequency. As a result, as shown in FIG. 7, also in the vehicle in which the steering operation can be performed without switching hands, it is possible to reduce the gain of the lateral acceleration in the frequency range in which the neck or body of the occupant is shaken to the same level as that of the normal vehicle.

5. Setting of Gear Ratio for Vehicle Speed

Figure 8:
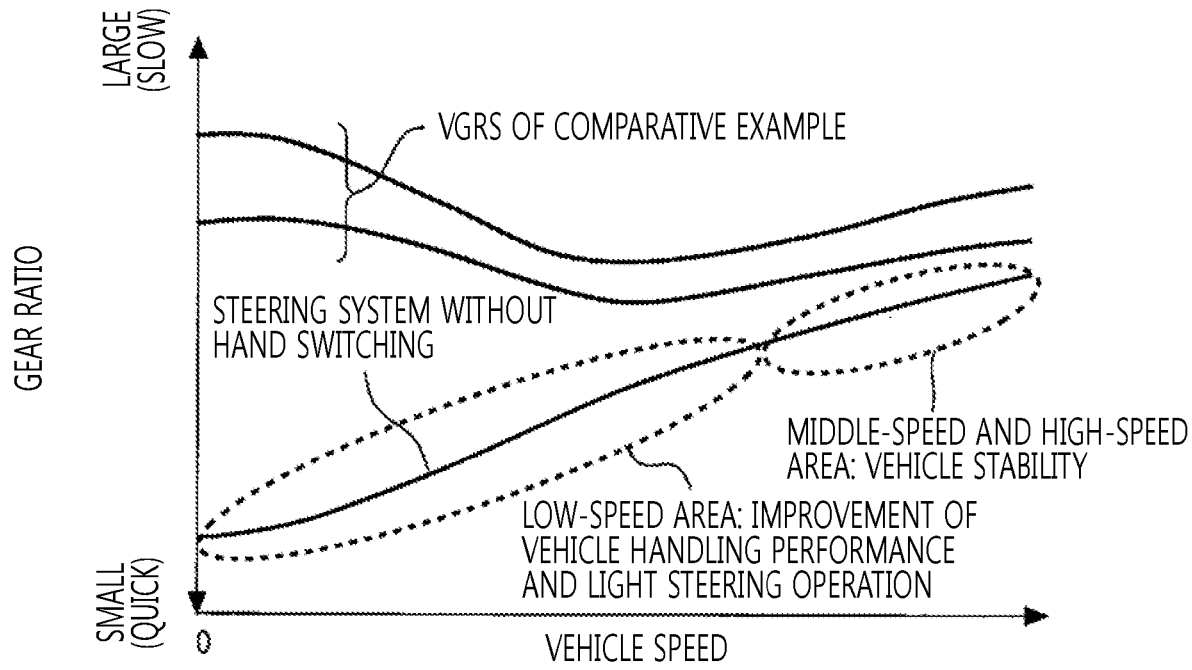
FIG. 8 is a diagram showing a relationship between a vehicle speed and a gear ratio according to the embodiment.

Next, the setting of the gear ratio for the vehicle speed will be described in detail with reference to the drawings. FIG. 8 is a diagram showing a relationship between the vehicle speed and the gear ratio realized by the control device 4. VGRS of a comparative example shown in the drawing means a mechanical gear ratio variable steering mechanism that is not a steer-by-wire type. Also in the VGRS of the comparative example, the gear ratio can be changed in response to the vehicle speed, but the variable width is not large. In contrast, since the steering mechanism 20 according to the embodiment is of a steer-by-wire type, it is possible to largely change the gear ratio as compared with the VGRS of the comparative example.

The gear ratio determining unit 33 determines the gear ratio from the vehicle speed by using maps or functions defining a relationship shown in FIG. 8. Specifically, the gear ratio determining unit 33 sets the gear ratio of the low-speed area to be smaller than the gear ratio of the high-speed area and monotonously decreases the gear ratio in response to a decrease in vehicle speed from the high-speed area to the low-speed area. The monotonous decrease mentioned herein means a broad monotonous decrease and a vehicle speed area in which the gear ratio is constant may exist. In the example shown in FIG. 8, the gear ratio continuously decreases from the high-speed area to the low-speed area so that the ratio of the turning angle change amount with respect to the steering angle change amount continuously increases from the high-speed area to the low-speed area. According to the setting of the gear ratio, the stability of the vehicle can be secured in the middle-speed area and the high-speed area and the improvement of the vehicle handling performance and the light steering operation can be expected in the low-speed area.

Figure 9:
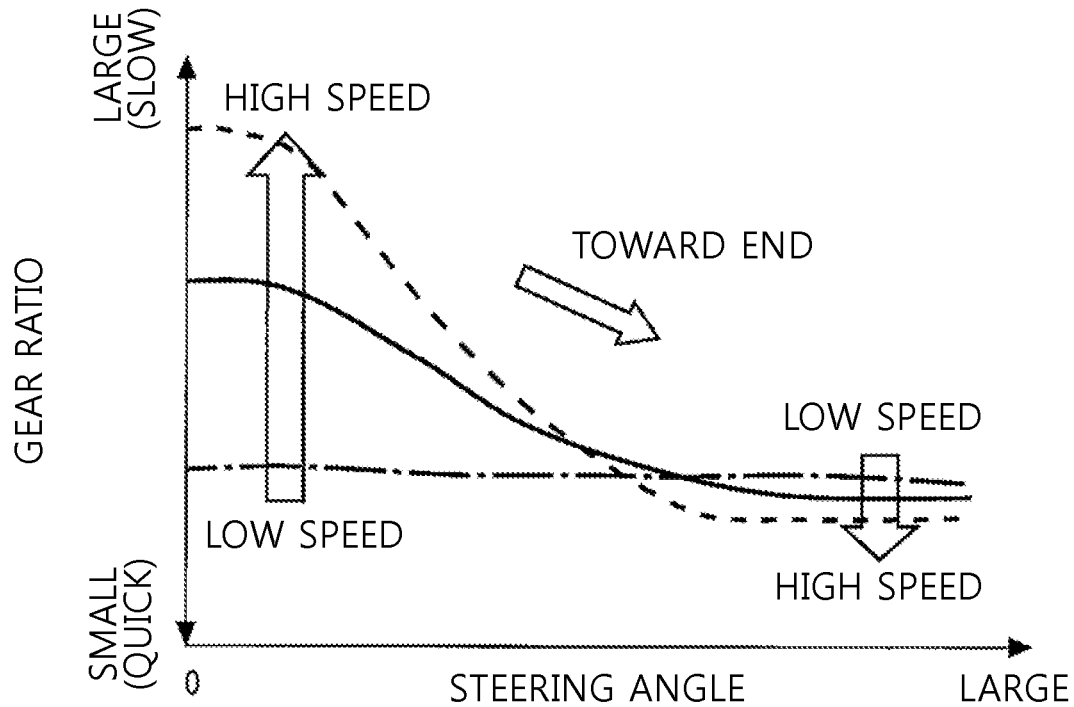
FIG. 9 is a diagram showing a relationship among a steering angle, a vehicle speed, and a gear ratio according to the embodiment.

Further, the gear ratio determining unit 33 changes the relationship between the vehicle speed and the gear ratio in response to the steering angle. FIG. 9 is a diagram showing a relationship among the steering angle, the vehicle speed, and the gear ratio realized by the control device 4. In FIG. 9, the relationship among the steering angle, the vehicle speed, and the gear ratio when the vehicle speed is a high speed (for example, about 80 km/h) is indicated by a dashed line, the relationship among the steering angle, the vehicle speed, and the gear ratio when the vehicle speed is a low speed (for example, 10 to 20 km/h) is indicated by a solid line, and the relationship among the steering angle, the vehicle speed, and the gear ratio when the vehicle speed is extremely a low speed (for example, about 6 km/h) is indicated by a one-dotted chain line.

As shown in FIG. 9, when the steering angle is near the neutral position, the gear ratio at a high vehicle speed is set to be larger than the gear ratio at a low vehicle speed. The relationship between the vehicle speed and the gear ratio shown in FIG. 8 is a relationship when the steering angle is near the neutral position. Meanwhile, when the steering angle is near the end position, the relationship of the gear ratio with respect to the vehicle speed is reversed and the gear ratio at a high vehicle speed is set to be smaller than the gear ratio at a low vehicle speed. For this reason, the ratio of the gear ratio change amount with respect to the steering angle change amount at a high vehicle speed is set to be larger than that at a low vehicle speed from the neutral position to the end position. Since the relationship between the vehicle speed and the gear ratio is reversed in the vicinity of the neutral position and the end position, it is possible to turn the steered wheel 25 to the maximum turning angle by the steering operation from the neutral position to the end position regardless of the vehicle speed. That is, the driver can steer the steering wheel 28 without switching hands in any vehicle speed area.

6. Setting of Cut-off Frequency for Vehicle Speed

Next, the setting of the cut-off frequency for the vehicle speed will be described in detail with reference to the drawings. The cut-off frequency determining unit 34 determines the cut-off frequency from the vehicle speed by using maps or functions. For example, the cut-off frequency of the low-speed area is set to be smaller than the cut-off frequency of the high-speed area in the vicinity of the neutral position and the cut-off frequency is monotonously decreased in response to a decrease in vehicle speed from the high-speed area to the low-speed area. However, the monotonous decrease mentioned herein means a broad monotonous decrease and a vehicle speed area in which the cut-off frequency is constant may exist.

According to the above-described setting, in the low-speed area in which the turning angle is changed at a high frequency by the driver's steering operation, the delay degree of the change in turning angle with respect to the change in steering angle becomes large by decreasing the cut-off frequency. Accordingly, the gain of the lateral acceleration caused by the operation at a high frequency is reduced. Meanwhile, in the high-speed area in which the turning angle is not easily changed at a high frequency, the delay degree of the change in turning angle with respect to the change in steering angle is kept relatively small by increasing the cut-off frequency. Accordingly, the responsiveness of the turning angle with respect to the steering operation is secured.

Figure 10:
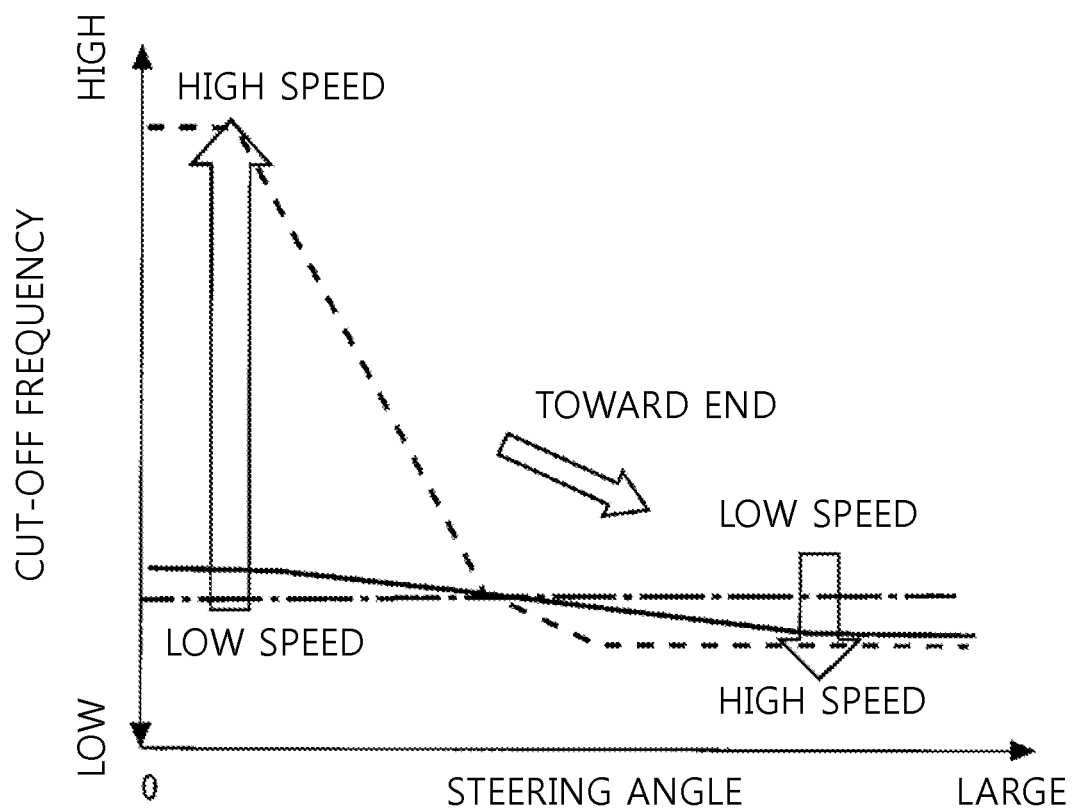
FIG. 10 is a diagram showing a relationship among a steering angle, a vehicle speed, and a cut-off frequency of a low-pass filter according to the embodiment.

Further, the cut-off frequency determining unit 34 changes the relationship between the vehicle speed and the cut-off frequency in response to the steering angle. FIG. 10 is a diagram showing a relationship among the steering angle, the vehicle speed, and the cut-off frequency realized by the control device 4. In FIG. 10, the relationship among the steering angle, the vehicle speed, and the cut-off frequency when the vehicle speed is a high speed (for example, about 80 km/h) is indicated by a dashed line, the relationship among the steering angle, the vehicle speed, and the cut-off frequency when the vehicle speed is a low speed (for example, 10 to 20 km/h) is indicated by a solid line, and the relationship among the steering angle, the vehicle speed, and the cut-off frequency when the vehicle speed is an extremely lower speed (for example, about 6 km/h) is indicated by a one-dotted chain line.

As shown in FIG. 10, when the steering angle is near the neutral position, the cut-off frequency at a high vehicle speed is set to be larger than the cut-off frequency at a low vehicle speed. Meanwhile, when the steering angle is near the end position, the relationship of the cut-off frequency with respect to the vehicle speed is reversed and the cut-off frequency at a high vehicle speed is set to be smaller than the cut-off frequency at a low vehicle speed. For this reason, the ratio of the cut-off frequency change amount with respect to the steering angle change amount at a high vehicle speed is set to be larger than the ratio of the cut-off frequency change amount with respect to the steering angle change amount at a low vehicle speed from the neutral position to the end position. That is, the cut-off frequency determining unit 34 changes the cut-off frequency with respect to the vehicle speed and the steering angle in the same tendency as a change in gear ratio with respect to the vehicle speed and the steering angle.

7. Effect of Turning Control

Finally, the effect of the turning control performed by the control device 4 in the above-described contents will be described. When the vehicle speed is a low speed, the gain of the lateral acceleration increases in a frequency range equal to or larger than a certain frequency and the phase of the lateral acceleration advances more than the phase of the yaw rate. As described above, the occupant particularly easily feels uncomfortable with respect to the lateral acceleration occurring in such a condition.

However, in the embodiment, the target turning angle converted from the steering angle passes through the low-pass filter. Then, since the turning motor 24 is controlled according to the correction target turning angle attenuated by the filter effect, the gain of the lateral acceleration in the frequency range in which the body or neck is shaken is reduced as shown in FIG. 7. Accordingly, the shaking of the neck or body prior to the turning of the vehicle is suppressed and the occupant hardly feels uncomfortable.

Figure 11:
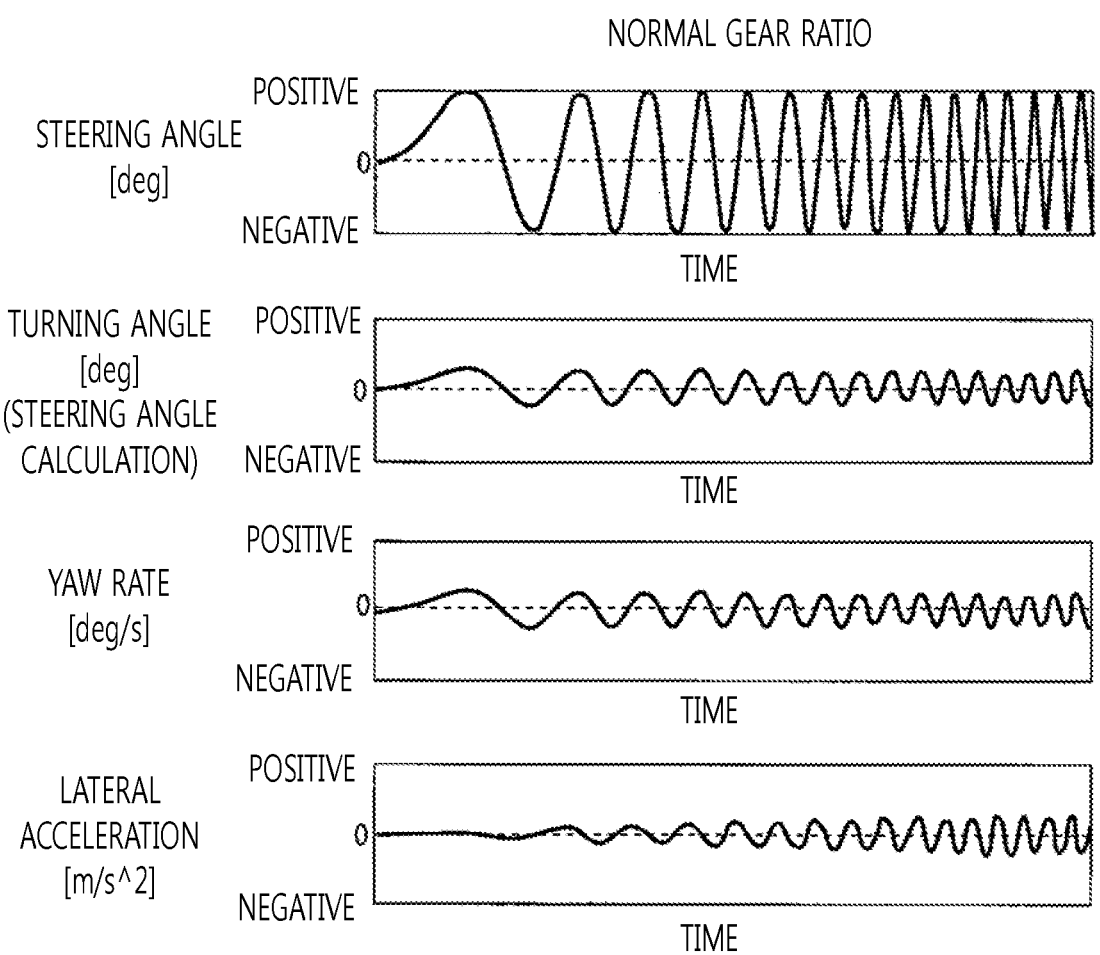
FIG. 11 is a diagram showing waveforms of a steering angle, a turning angle, a yaw rate, and a lateral acceleration with respect to a periodic steering operation in a steering system that requires switching of hands on a steering wheel.
Figure 12:
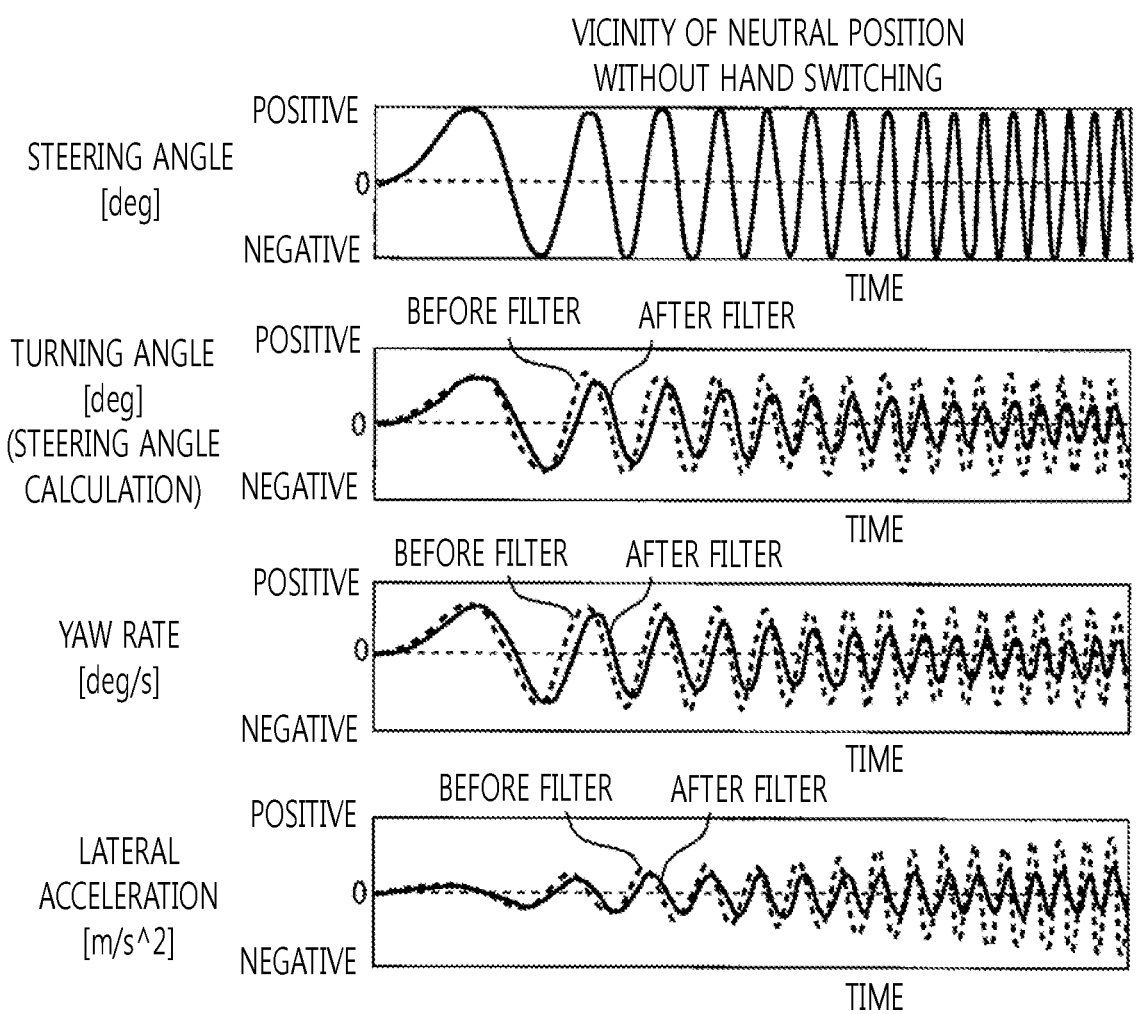
FIG. 12 is a diagram showing waveforms of a steering angle, a turning angle, a yaw rate, and a lateral acceleration with respect to a periodic steering operation near a neutral position in the steering system according to the embodiment.
Figure 13:
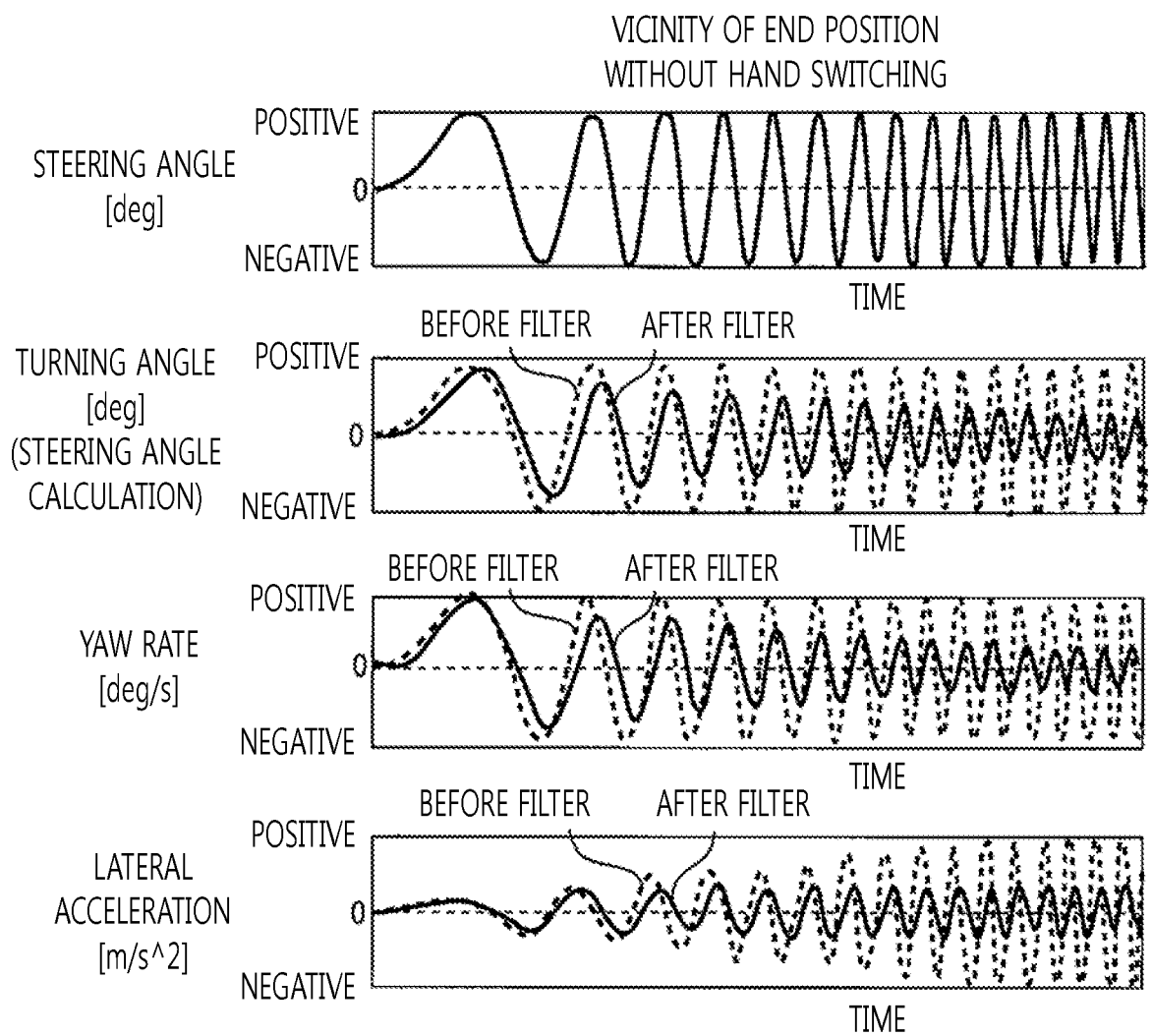
FIG. 13 is a diagram showing waveforms of a steering angle, a turning angle, a yaw rate, and a lateral acceleration with respect to a periodic steering operation near an end position in the steering system according to the embodiment.

FIGS. 11, 12, and 13 are diagrams showing waveforms of the steering angle, the turning angle, the yaw rate, and the lateral acceleration with respect to a periodic steering operation. However, FIG. 11 shows a waveform in the steering system that requires switching of hands on the steering wheel and FIGS. 12 and 13 show waveforms of the steering system 2 according to the embodiment. Particularly, FIG. 12 shows a waveform which can be obtained by a periodic steering operation in the vicinity of the neutral position and FIG. 13 shows a waveform which can be obtained by a periodic steering operation in the vicinity of the end position. The gear ratio in the case shown in FIG. 11 is a normal gear ratio of the steering system that requires switching of hands. The gear ratio in the case shown in FIG. 12 and the gear ratio in the case shown in FIG. 13 are gear ratios smaller than the normal gear ratio. However, in the gear ratio in the case shown in FIG. 12 and the gear ratio in the case shown in FIG. 13, the gear ratio in the case shown in FIG. 13 is smaller than the gear ratio in the case shown in FIG. 12.

In FIGS. 11, 12, and 13, the waveforms of the steering angles at the top are common. However, since there is a difference in gear ratio, according to the steering system 2 of the embodiment, it is possible to generate the yaw rate larger than the yaw rate of the steering system that requires switching of hands. That is, according to the steering system 2 of the embodiment, it is possible to improve turning performance by increasing the yaw rate.

Further, according to the steering system 2 of the embodiment, since the process is performed by the low-pass filter, a change in turning angle is delayed with respect to a change in steering angle regardless of the turning-over operation or the turning-back operation. In particular, since the cut-off frequency with respect to the steering angle is set, the delay degree of the change in turning angle with respect to the change in steering angle at the vicinity of the end position in which the gear ratio is small and the ratio of the turning angle change amount with respect to the steering angle change amount is large is larger than the delay degree of the change in turning angle with respect to the change in steering angle at the vicinity of the neutral position regardless of the turning-over operation or the turning-back operation.

As a result, according to the steering system 2 of the embodiment, the gain of the lateral acceleration caused by the steering operation can be suppressed to the same gain as the lateral acceleration caused by the normal gear ratio even in the turning-over operation or the turning-back operation at both of the vicinity of the neutral position and the vicinity of the end position. In particular, it is possible to remarkably suppress the gain of the lateral acceleration in the frequency range in which the neck or body is shaken prior to the turning of the vehicle.

8. Other Embodiments

Figure 14:
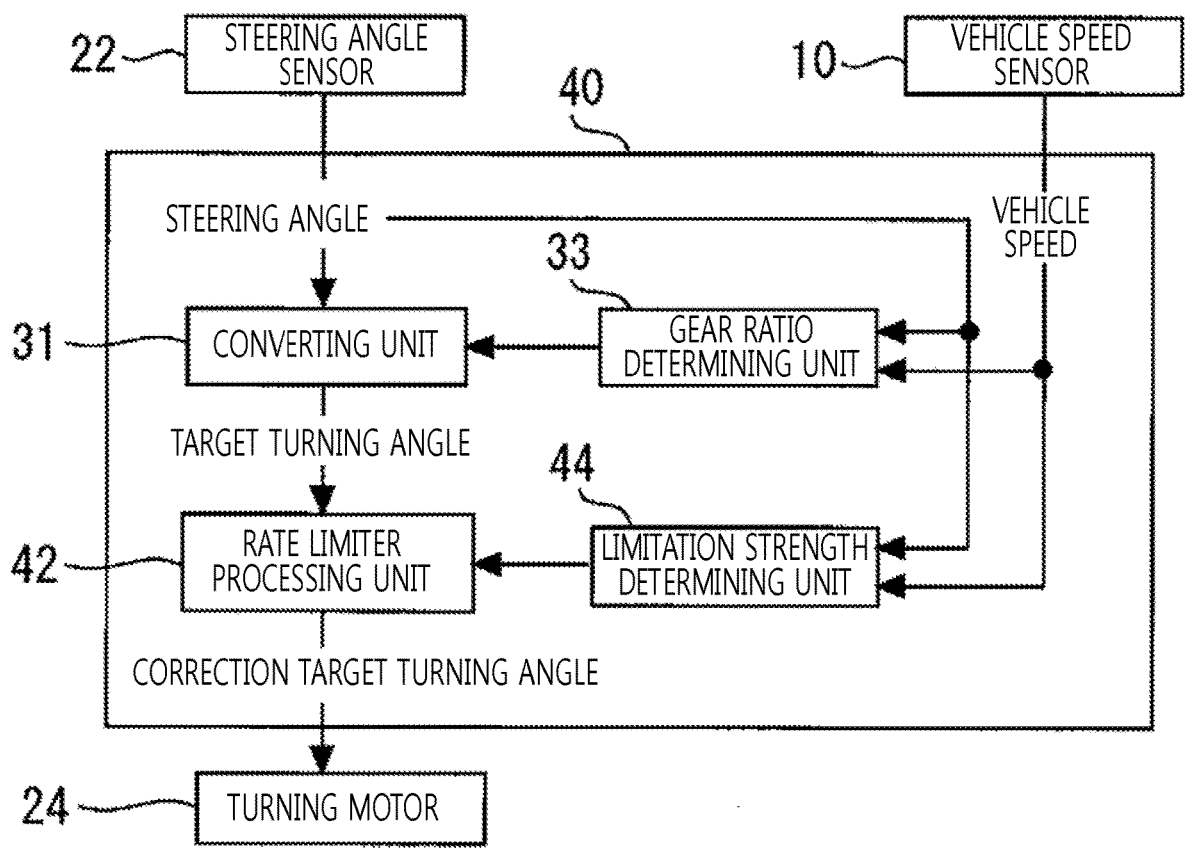
FIG. 14 is a diagram showing a function of a control device of a steering system according to another embodiment of the disclosure.

FIG. 14 is a diagram conveniently illustrating a configuration of a control device 40 of a steering system according to another embodiment of the disclosure. In FIG. 14, a function of the control device 40 relating to turning control is depicted as a block. As depicted as a block in FIG. 14, the control device 40 includes a converting unit 31, a rate limiter processing unit 42, a gear ratio determining unit 33, and a limitation strength determining unit 44. Since the functions of the converting unit 31 and the gear ratio determining unit 33 have been described above, a description thereof will be omitted herein.

The rate limiter processing unit 42 passes the target turning angle obtained by the converting unit 31 through the rate limiter. The rate limiter limits a change amount per each control period of the target turning angle and outputs the limited target turning angle as the correction target turning angle. The rate limiter is designed so that a change amount limitation effect works not only in a change in target turning angle caused by the turning-over operation but also in a change in target turning angle caused by the turning-back operation. Since the turning motor 24 is controlled according to the correction target turning angle in which a change amount is limited by the rate limiter, a delay in a change in turning angle with respect to a change in steering angle occurs. This delay degree depends on the strength of limitation of the rate limiter.

The strength of limitation of the rate limiter means the magnitude of the change amount limited by the rate limiter. As the limitation of the rate limiter becomes strong, the target turning angle change amount per each control period is suppressed to be small. The strength of limitation of the rate limiter is determined by the limitation strength determining unit 44. The steering angle and the vehicle speed are input to the limitation strength determining unit 44. The limitation strength determining unit 44 determines the strength of limitation of the rate limiter by the first process and the second process based on these input information.

In the relationship with the steering angle, the limitation strength determining unit 44 changes the strength of limitation of the rate limiter in response to the steering angle. However, the strength of limitation is determined with respect to the steering angle and is not dependent on the turning-over operation of increasing the steering angle or the turning-back operation of decreasing the steering angle. The limitation strength determining unit 44 weakens the limitation of the rate limiter so that the delay degree of the change in turning angle with respect to the change in steering angle in the first steering angle area is larger than the delay degree of the change in turning angle with respect to the change in steering angle in the second steering angle area. This is the first process which is performed by the limitation strength determining unit 44.

Figure 15:
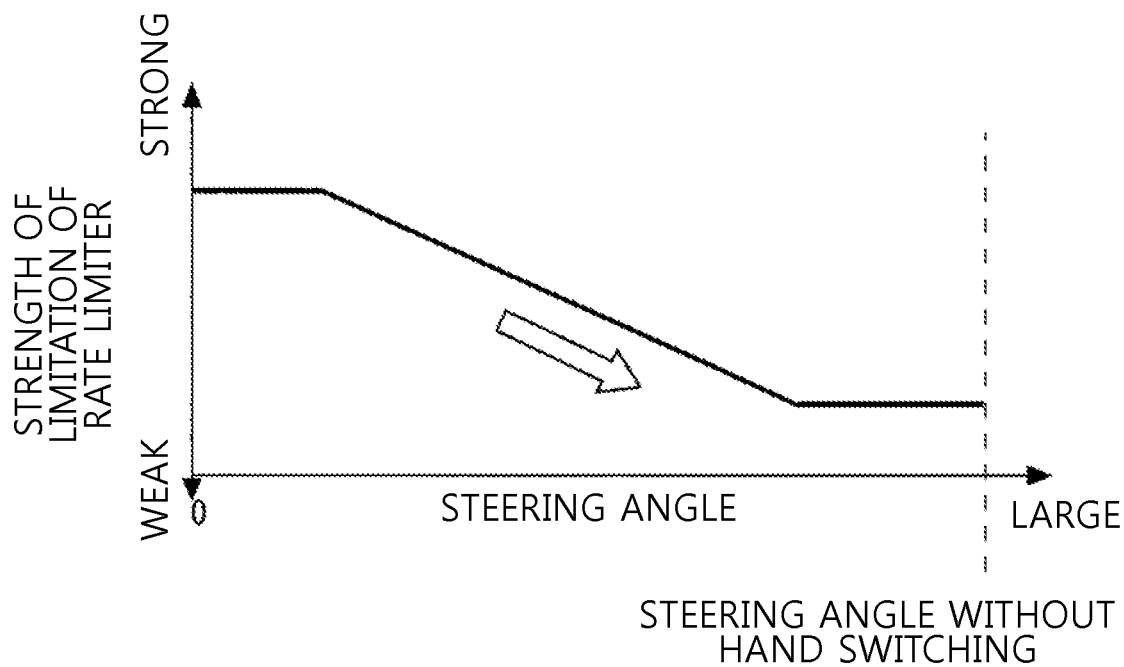
FIG. 15 is a diagram showing a relationship between a steering angle and strength of limitation of a rate limiter according to another embodiment.

FIG. 15 is a diagram showing a relationship between the steering angle and the strength of limitation of the rate limiter realized by the control device 40. The limitation strength determining unit 44 determines the strength of limitation of the rate limiter from the steering angle by using maps or functions defining a relationship shown in FIG. 15. Specifically, the limitation strength determining unit 44 weakens the strength of limitation at the end position of the steering wheel 28 as compared with the strength of limitation at the neutral position thereof and monotonously decreases the strength of limitation in response to an increase in steering angle from the neutral position to the end position. The monotonous decrease mentioned herein means a broad monotonous decrease and a steering angle area in which the strength of limitation of the rate limiter is constant may exist.

Further, in the relationship with the vehicle speed, the limitation strength determining unit 44 changes the strength of limitation of the rate limiter in response to the vehicle speed. However, the limitation strength determining unit 44 allows the relationship between the vehicle speed and the strength of limitation of the rate limiter to be dependent on the steering angle. For example, when the steering angle is near the neutral position, the limitation of the rate limiter is weakened so that the delay degree of the change in turning angle with respect to the change in steering angle in the first vehicle speed area is larger than the delay degree of the change in turning angle with respect to the change in steering angle in the second vehicle speed area. This is the second process which is performed by the limitation strength determining unit 44.

Figure 16:
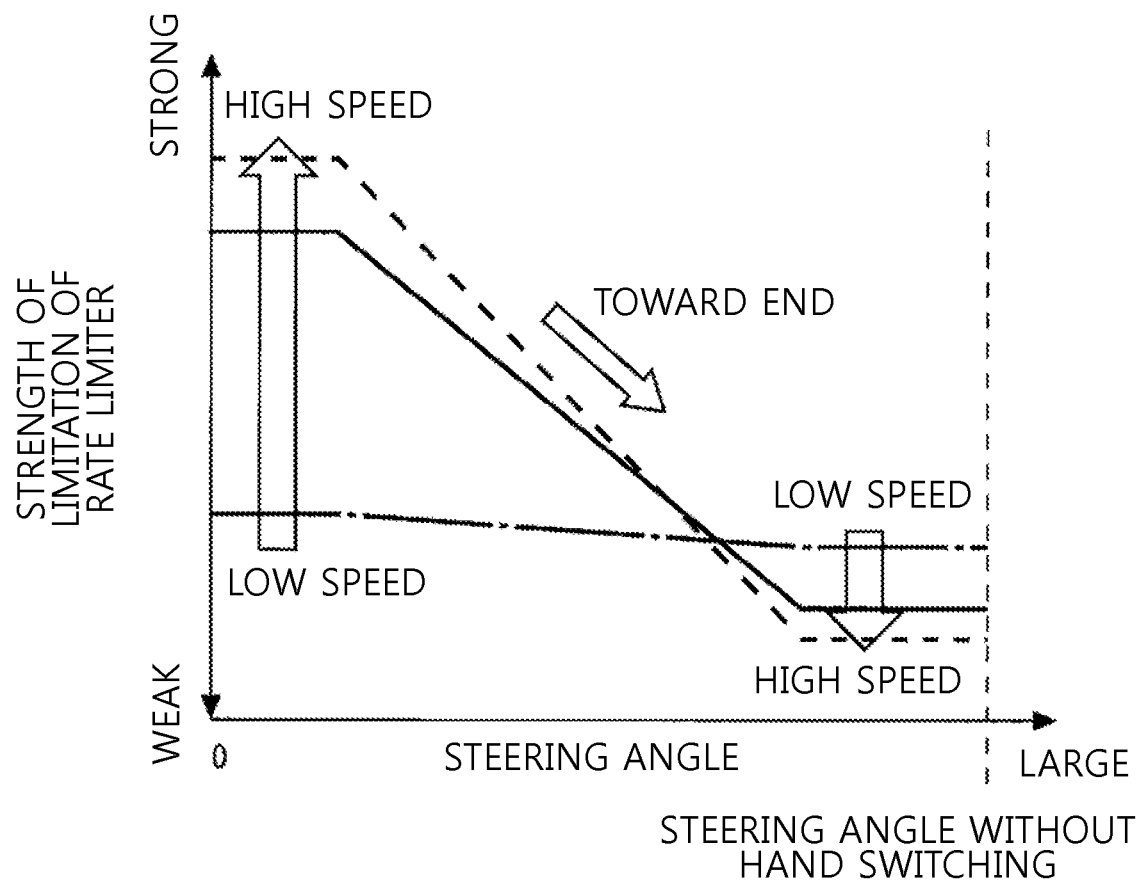
FIG. 16 is a diagram showing a relationship among a steering angle, a vehicle speed, and strength of limitation of a rate limiter according to another embodiment.

FIG. 16 is a diagram showing a relationship among the steering angle, the vehicle speed, and the strength of limitation of the rate limiter realized by the control device 40. In FIG. 16, the relationship at a high vehicle speed is indicated by a dashed line, the relationship at a low vehicle speed is indicated by a solid line, and the relationship at an extremely low vehicle speed is indicated by a one-dotted chain line. When the steering angle is near the neutral position, the limitation of the rate limiter at a low vehicle speed is weaker than the limitation of the rate limiter at a high vehicle speed. On the other hand, when the steering angle is near the end position, the relationship of the strength of limitation of the rate limiter with respect to the vehicle speed is reversed and the limitation of the rate limiter at a high vehicle speed is set to be weaker than the limitation of the rate limiter at a low vehicle speed. The limitation strength determining unit 44 changes the strength of limitation of the rate limiter with respect to the vehicle speed and the steering angle in a tendency opposite to a change in gear ratio with respect to the vehicle speed and the steering angle.

According to the above-described functions of the control device 40, in the first steering angle area in which the turning angle is changed at a high frequency by the driver's steering operation, by weakening the limitation of the rate limiter, the delay degree of the change in turning angle with respect to the change in steering angle increases and hence the gain of the lateral acceleration caused by the high-frequency operation can be reduced. On the other hand, in the second steering angle area in which the turning angle is not easily changed at a high frequency, by strengthening the limitation of the rate limiter, the delay degree of the change in turning angle with respect to the change in steering angle is kept relatively small and hence the responsiveness of the turning angle with respect to the steering operation can be secured. That is, it is possible to suppress the occurrence of the lateral acceleration causing the occupant to feel uncomfortable while securing the responsiveness of the turning angle with respect to the steering operation.

What is claimed is:

1. A steering system comprising:
a steering mechanism that turns a steered wheel by a turning motor while not being mechanically connected to a steering member;
a steering angle sensor configured to detect a steering angle of the steering member; and
an electronic control unit configured to:
determine whether the steering angle is in a first steering angle area or a second steering angle area, wherein the first steering angle area includes an end position of the steering member and the second steering angle area includes a neutral position of the steering member;
set a ratio of a turning angle change amount with respect to a steering angle change amount, wherein the ratio in the first steering angle area is larger than the ratio in the second steering angle area;
based on the ratio, convert the steering angle of the steering member into a target turning angle for the steered wheel;
set a delay degree of a change in turning angle with respect to a change in the steering angle in the first steering angle area to be larger than the delay degree of the change in turning angle with respect to the change in the steering angle in the second steering angle area regardless of a turning-over operation or a turning-back operation; set a cut-off frequency of a low-pass filter depending on the ratio of the turning angle change amount with respect to the steering angle change amount;
obtain a correction target turning angle by passing the target turning angle through the low-pass filter having the set cut-off frequency; and
control the turning motor according to the correction target turning angle.

2. The steering system according to claim 1, wherein the steering system is configured such that the ratio of the turning angle change amount with respect to the steering angle change amount continuously changes from the second steering angle area to the first steering angle area, and
the electronic control unit is configured such that the delay degree of the change in turning angle with respect to the change in steering angle continuously changes from the second steering angle area to the first steering angle area in the first process.

3. The steering system according to claim 2, wherein the steering system is configured such that the ratio of the turning angle change amount with respect to the steering angle change amount continuously increases from the second steering angle area to the first steering angle area, and
the electronic control unit is configured such that the delay degree of the change in turning angle with respect to the change in steering angle continuously increases from the second steering angle area to the first steering angle area in the first process.

4. The steering system according to claim 1, wherein the steering system is configured such that the ratio of the turning angle change amount with respect to the steering angle change amount in a first vehicle speed area is larger than the ratio of the turning angle change amount with respect to the steering angle change amount in a second vehicle speed area, a vehicle speed of the second vehicle speed area being higher than the vehicle speed of the first vehicle speed area, and
the electronic control unit is configured to further perform a second process that includes setting the cut-off frequency of the low-pass filter so that the delay degree of the change in turning angle with respect to the change in steering angle in the first vehicle speed area is larger than the delay degree of the change in turning angle with respect to the change in steering angle in the second vehicle speed area.

5. The steering system according to claim 4, wherein the steering system is configured such that the ratio of the turning angle change amount with respect to the steering angle change amount continuously changes from the second vehicle speed area to the first vehicle speed area, and
the electronic control unit is configured such that the delay degree of the change in turning angle with respect to the change in steering angle continuously changes from the second vehicle speed area to the first vehicle speed area in the second process.

6. The steering system according to claim 5, wherein the steering system is configured such that the ratio of the turning angle change amount with respect to the steering angle change amount continuously increases from the second vehicle speed area to the first vehicle speed area, and
the electronic control unit is configured such that the delay degree of the change in turning angle with respect to the change in steering angle continuously increases from the second vehicle speed area to the first vehicle speed area in the second process.

7. A control method for a steering system that includes a steering mechanism that turns a steered wheel by a turning motor while not being mechanically connected to a steering member, a steering angle sensor configured to detect a steering angle of the steering member, and an electronic control unit, the method comprising:
determining whether the steering angle is in a first steering angle area or a second steering angle area, wherein the first steering angle area includes an end position of the steering member and the second steering angle area includes a neutral position of the steering member;
setting, by the electronic control unit, a ratio of a turning angle change amount with respect to a steering angle change amount, wherein the ratio in the first steering angle area is larger than the ratio in the second steering angle area;
based on the ratio, converting the steering angle of the steering member into a target turning angle for the steered wheel;
setting a delay degree of a change in turning angle with respect to a change in the steering angle in the first steering angle area to be larger than a delay degree of a change in turning angle with respect to a change in the steering angle in the second steering angle area by the electronic control unit regardless of a turning-over operation or a turning-back operation;
setting a cut-off frequency of a low-pass filter depending on the ratio of the turning angle change amount with respect to the steering angle change amount;

obtaining a correction target turning angle by passing the target turning angle through a low-pass filter having the set cut-off frequency; and controlling the turning motor according to the correction target turning angle.

\* \* \* \* \*